(12) United States Patent
Upadhyaya et al.

(10) Patent No.: US 10,368,184 B2
(45) Date of Patent: Jul. 30, 2019

(54) ADVERTISING AND PROFILING USER LOCATION TO UNIFIED COMMUNICATION SUITE IN ENTERPRISE WIRELESS NETWORKS

(71) Applicant: Hewlett Packard Enterprise Development LP, Houston, TX (US)

(72) Inventors: Vigneshwara Upadhyaya, Bangalore (IN); Gopakumar Nambisan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/498,450

(22) Filed: Sep. 26, 2014

(65) Prior Publication Data
US 2016/0094938 A1    Mar. 31, 2016

(51) Int. Cl.
H04W 4/02    (2018.01)

(52) U.S. Cl.
CPC .................................. *H04W 4/02* (2013.01)

(58) Field of Classification Search
USPC ............................................... 455/456.1–457
See application file for complete search history.

(56) References Cited

U.S. PATENT DOCUMENTS

| | | | | |
|---|---|---|---|---|
| 7,117,445 B2* | 10/2006 | Berger | ................ | G06F 1/1622 715/752 |
| 8,145,241 B2* | 3/2012 | Singh | ................ | H04L 63/102 370/328 |
| 8,738,772 B2* | 5/2014 | Erb | ................ | H04L 63/107 455/418 |
| 2007/0182546 A1* | 8/2007 | Virk | ................ | H04W 4/02 340/539.13 |
| 2009/0005040 A1* | 1/2009 | Bourne | ................ | H04L 12/588 455/435.1 |
| 2010/0161728 A1* | 6/2010 | Drozt | ................ | G06Q 10/10 709/204 |
| 2010/0304719 A1* | 12/2010 | Deep | ................ | H04M 1/72566 455/413 |
| 2011/0081918 A1* | 4/2011 | Burdo | ................ | G01C 21/20 455/456.1 |
| 2012/0046029 A1* | 2/2012 | Sylvain | ................ | H04W 4/043 455/423 |

(Continued)

OTHER PUBLICATIONS

Cisco; "Chapter: Roles and User Groups"; Cisco Uni• ed Communications Manager System Guide, Release 10.0(1); Sep. 23, 2015; 17 pages.

(Continued)

*Primary Examiner* — Steven S Kelley
(74) *Attorney, Agent, or Firm* — Hewlett Packard Enterprise Patent Department

(57) ABSTRACT

The present disclosure discloses a method and a network device for advertising and profiling user location to unified communication suite in enterprise wireless environments. Specifically, a network device can determine a location of a first client device corresponding to a user. Based at least on the location of the first client device corresponding to the user, the network device can infer a status for the first user. Further, the network device can display, store and/or transmit the inferred status for the user on an enterprise wireless network. The status has not been explicitly indicated by the user.

20 Claims, 5 Drawing Sheets

(56) References Cited

U.S. PATENT DOCUMENTS

| | | | | |
|---|---|---|---|---|
| 2012/0208550 A1* | 8/2012 | Proietti | .................. | G01S 5/0027 |
| | | | | 455/456.1 |
| 2012/0264446 A1* | 10/2012 | Xie | ..................... | G01C 22/00 |
| | | | | 455/456.1 |
| 2013/0190016 A1* | 7/2013 | Krishnakumar | ....... | G06Q 50/00 |
| | | | | 455/456.3 |
| 2014/0179230 A1* | 6/2014 | Sydir | .................... | H04W 4/025 |
| | | | | 455/41.2 |
| 2016/0007173 A1* | 1/2016 | Dowlatkhah | ......... | H04W 4/206 |
| | | | | 455/414.1 |

OTHER PUBLICATIONS

Firewall Roles; "Roles and Policies"; Chapter 10; printed on May 1, 2017 from http://www.arubanetworks.com/techdocs/ArubaOS_60/UserGuide/Firewall_Roles.php#XREF_48865_Creating_a_New; 18 pages.

* cited by examiner

US 10,368,184 B2

ADVERTISING AND PROFILING USER LOCATION TO UNIFIED COMMUNICATION SUITE IN ENTERPRISE WIRELESS NETWORKS

FIELD

Embodiments of the present disclosure relate to client status management in wireless local area networks. In particular, embodiments of the present disclosure describe a method and network device for advertising and profiling user locations to unified communication suite in enterprise wireless networks.

BACKGROUND

Unified communications (UC) generally refers to the integration of real-time communication services, such as instant messaging, presence information, telephony, video conferencing, desktop sharing, data sharing, call control, and speech recognition with non-real-time communication services such as unified messaging (e.g., integrated voicemail, email, text message, and facsimile).

Large enterprises deployed with wireless local area networks (WLANs) often use UC suites concomitantly. For example, a company may have a UC suite installed on enterprise computers. Also, enterprises with a Bring Your Own Device (BYOD) policy may allow its employees to install UC suite on their personal mobile devices. The employees can display their presence information, such as, busy, available, away, in a meeting, do not disturb, off work, etc., after they log in to the UC suite.

Accurate display of presence information facilitates communications between users. Presently, some UC suite is able to integrate with another software, such as, an email client software, and update a user's presence information automatically based on information retrieved from the other software. For example, if an employee's email calendar indicates that the employee has a meeting scheduled between 9 am and 10 am in the morning, the UC suite can automatically display the employee's presence status as "in a meeting" between that period of time. In the event that the meeting is canceled and the employee fails to update his or her calendar, the UC suite is prone to display inaccurate information. Enterprise wireless networks, on the other hand, often have real-time accurate information about the user, e.g., user location, user role, etc. Nevertheless, such information has not been previously integrated with UC suite.

DETAILED DESCRIPTION

In the following description, several specific details are presented to provide a thorough understanding. While the context of the disclosure is directed to client status management in wireless local area networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

OVERVIEW

Embodiments of the present disclosure relate to client status management in enterprise wireless networks. In particular, embodiments of the present disclosure describe a method and network device for advertising and profiling user locations to Unified Communication (UC) suites in enterprise wireless networks.

A typical enterprise wireless network will have many access points (APs) installed across the campus. An enterprise user can log in to UC suite from any computer or mobile devices. Using a triangulation method or based on the AP with which the client is connected, the wireless network infrastructure can determine the location of the client. Moreover, the wireless network infrastructure can profile the client based on its user role and/or location, and infer status and/or user presence information from the user profile information. The status and/or user presence information can be presented to a UC suite using an application programming interface (API), and then displayed in a user interface by the UC suite.

With the solution provided herein, a network device can determine a location of a first client device corresponding to a user. Based at least on the location of the first client device corresponding to the user, the network device can infer a status for the user. Furthermore, the network device can display, store and/or transmit the status for the first user. In some embodiments, the network device can infer the status of the user further based on a role of the user or a profession of the user.

User Status in Unified Communication Suites

Figure 1A:
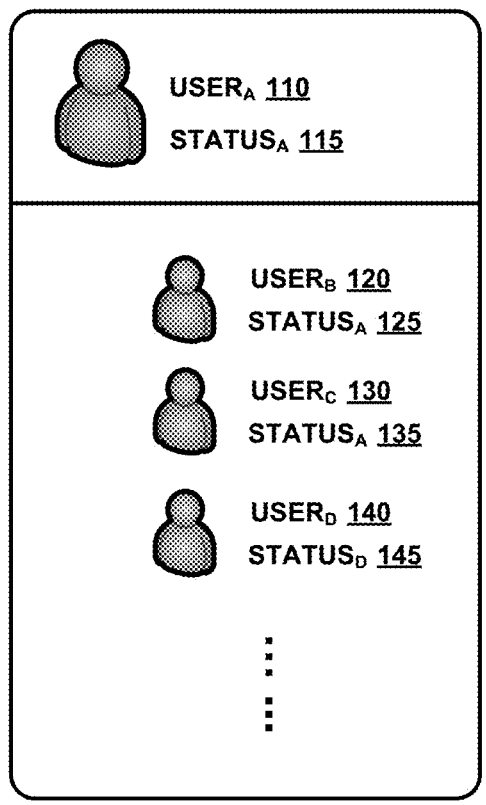
FIG. 1A shows an exemplary display of user presence information according to embodiments of the present disclosure.

FIG. 1A shows an exemplary display of user presence information according to embodiments of the present disclosure. FIG. 1A includes a current user of UC suite, e.g., User$_A$ 110 and his/her corresponding presence information, e.g., Status$_A$ 115. Furthermore, FIG. 1A also includes User$_A$ 110's contacts, which includes, for example, User$_B$ 120, User$_C$ 130, User$_D$ 140, etc. In some embodiments, the contact list can be automatically retrieved from a company directory and populated in the UC suite. In some embodiments, User$_A$ 110 can add, remove, group, sort, and/or customize the contact list.

Figure 1B:
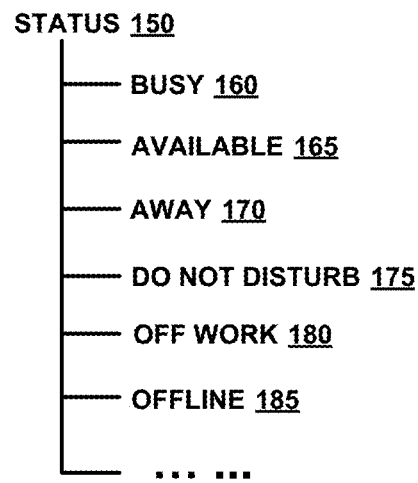
FIG. 1B shows an exemplary list of user presence information according to embodiments of the present disclosure.

Any user, such as, User$_A$ 110, can update the user's own displayed status with a number of other presence information. Specifically, FIG. 1B shows an exemplary list of user presence information according to embodiments of the present disclosure. Status 150 shown in FIG. 1B includes, but is not limited to, busy 160, available 165, away 170, do not disturb 175, off work 180, offline 185, etc. Specifically, status busy 160 may indicate that the user is current occupied and unable to communicate on UC suite. Status available 165 may indicate that the user is currently available for communications on through the UC suite. Status away 170 may indicate that the user is away from the computer and/or mobile device and thus response may be delayed. Status do not disturb 170 may indicate that the user currently is unwilling to communicate on the UC suite. Status off work 180 may indicate that the user is not able to communicate on work-related matters on UC suite. Status offline 185 may indicate that the user currently is not logged on to the UC suite.

The UC suite may be configured to automatically update a user's presence information. For example, when User$_A$ 110 logs in to the UC suite, Status$_A$ 115 may be automatically updated to display status "available" 165. Likewise, when User$_A$ 110 logs in to the UC suite, Status$_A$ 115 will automatically display status "offline" 185. If User$_A$ 110's computer and/or mobile device has been idle for a predetermined period of time, Status$_A$ 115 will automatically display status "away" 170.

In some embodiments, the UC suite may be integrated with software including an electronic calendar service. Thus, the UC suite can search for User$_A$ 110's calendar to determine whether User$_A$ 110 has an appointment and/or meeting scheduled currently, and automatically updates Status$_A$ 115 accordingly. For example, if the UC suite determines that User$_A$ 110 currently has a scheduled appointment based on User$_A$ 110's calendar, the UC suite may update Status$_A$ 115 as status "busy" 160. Moreover, if the UC suite determines that User$_A$ 110 currently has a scheduled meeting based on User$_A$ 110's calendar, the UC suite may update Status$_A$ 115 as status "in a meeting." Similarly, if the UC suite determines that User$_A$ 110 is actively using the VoIP services, the UC suite may update Status$_A$ 115 as status "in a call." If the UC suite determines that User$_A$ 110 is actively using screen share feature of the UC suite, the UC suite may update Status$_A$ 115 as status "presenting" so that other users would avoid sending instant messages to User$_A$ 110, which might inadvertently be displayed to an unintended third party during User$_A$ 110's presentation.

Network Computing Environment

Figure 2A:
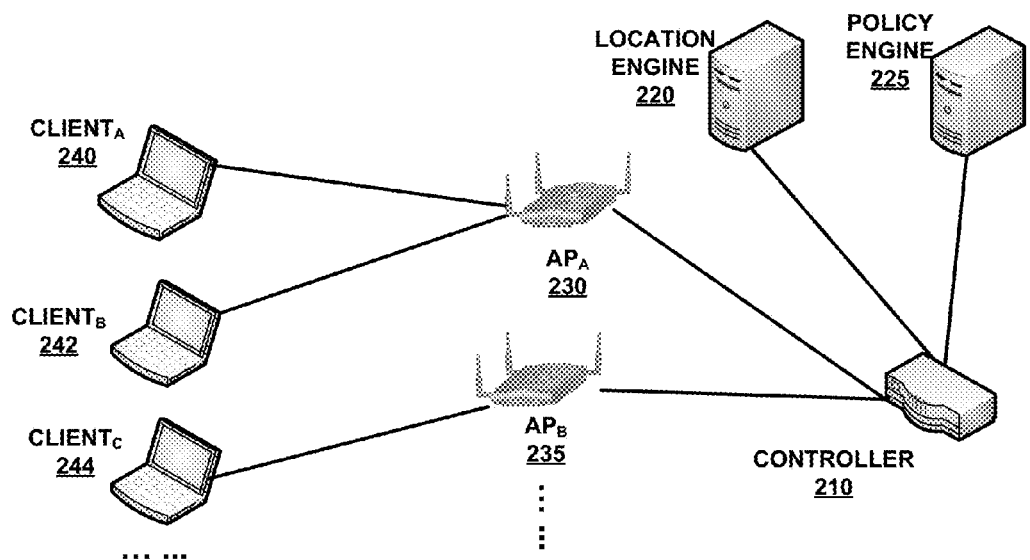
FIG. 2A shows an exemplary wireless enterprise network environment according to embodiments of the present disclosure.

FIG. 2A shows an exemplary wireless enterprise network environment according to embodiments of the present disclosure. FIG. 2A includes at least a network controller 210, a location engine 220, a policy engine 225, one or more access points, such as, AP$_A$ 230, AP$_B$ 235, etc., and one or more client devices, such as Client$_A$ 240, Client$_B$ 242, Client$_C$ 244, etc.

Network controller 210 generally refers to a controlling device that manages other network devices such as wireless access points. Network controller 210 may handle automatic adjustments to radio frequency power, wireless channels, wireless authentication, and/or security. Furthermore, network controller 210 can be combined to form a wireless mobility group to allow inter-controller roaming. Network controller 210 can be part of a mobility domain to allow clients access throughout large or regional enterprise facility locations. This saves the clients time and administrators overhead because it can automatically re-associate or re-authenticate.

Location engine 220 generally refers to a device and/or a logical entity that can gather client location information from the network, process it and share it through a standard application programming interface (API). Specifically, location engine 220 calculates the associated and unassociated client device locations periodically, e.g., every 30 seconds by default. For every client device on the network, location engine 220 can provide at least the following information through the API: client's user name, client's Internet Protocol (IP) address, client's Media Access Control (MAC) address, client device type, client's application firewall data which shows the destinations and applications used by associated devices, client's current location, client's historical locations, etc. Typically, APs place data to be able to calculate location for the devices in a network infrastructure for location engine 220. The client information gathered by location engine 220 can be used for analyzing a client's internet behavior for business such as shopping preferences. Note that, location engine 220 may be residing on a server, a cloud computing device, and/or a network device, such as, a network controller, an AP, etc.

Policy engine 225 generally refers to a device and/or logical entity that provides role-based and/or device-based network access control for employees, contractors, guests, and any other users across any wired, wireless, and/or VPN infrastructure. Specifically, policy engine 225 can maintain user information, such as a user's role, device type, Mobile Device Management (MDM) attributes, device health, location, time-of-day, etc. Furthermore, policy engine 225 can grant users granular network access privileges based on the user information. User attributes from multiple identity stores, such as Microsoft Active Directory®, Lightweight Directory Access Protocol (LDAP)-compliant directory, Open Database Connectivity (ODBC)-compliant Structured Query Language (SQL) database, token servers, and internal databases across domains can be used within a single policy for fine-grained control. Like location engine 220, policy engine 225 may be residing on a server, a cloud computing device, and/or a network device, such as, a network controller, an AP, etc.

Access points, e.g., AP$_A$ 230 and AP$_B$ 235, generally refer to a set of wireless network devices that allow wireless client devices to connect to a wired network using IEEE 802.11 or related standards. The APs usually connect to a router via a wired network, but can also be an integral component of the router itself. Each access point serves one or more client devices. For illustration purposes only, assuming that Client$_A$ 240 and Client$_B$ 242, is associated with AP$_A$ 230; and, ClientC 244 is associated with AP$_B$ 235.

Inference of User Status Based on Location

Figure 2B:
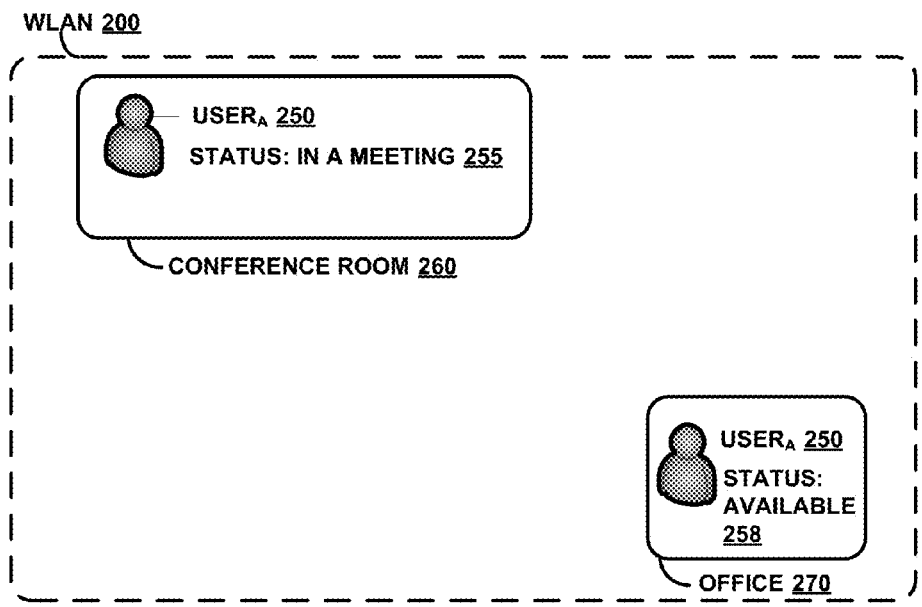
FIG. 2B shows an exemplary scenario in which user presence information is inferred based on location information provided by a WLAN according to embodiments of the present disclosure.

FIG. 2B shows an exemplary scenario in which user presence information is inferred based on location information provided by a WLAN according to embodiments of the present disclosure. FIG. 2B includes a wireless network infrastructure WLAN 200, which is further illustrated in FIG. 2A. WLAN 220 is deployed over a physical are that includes at least a conference room 260 and an office 270. For illustration purposes only, assuming that User$_A$ 250 regularly works in office 270, but occasionally attends meetings in conference room 260.

The network infrastructure WLAN 200 can extract information of $User_A$ 250's location either from location engine 220 or based on which AP that $User_A$ 250 is associated with. For example, if $User_A$ 250's client device is connected to the AP in conference room 260, WLAN 200 can infer that $User_A$ 250 is located in conference room 260. On the other hand, if $User_A$ 250's client device is connected to the AP near office 270, WLAN 200 can infer that $User_A$ 250 is located in office 270.

In some embodiments, WLAN 200 can send $User_A$ 250's location to the UC suite for display. In some embodiments, WLAN 200 can infer a user status for $User_A$ 250 based on $User_A$ 250's location. For example, as shown in FIG. 2B, if $User_A$ 250 is determined to be located in conference room 260, WLAN 200 can infer that $User_A$ 250 is in a meeting. On the other hand, if $User_A$ 250 is determined to be located in office 270, WLAN 200 can infer that $User_A$ 250 is available. WLAN 200 can then send the user status to the UC suite. As a result, the UC suite will display user status "in a meeting" 255 when $User_A$ 250 is in conference room 260, and user status available 258 when $User_A$ 250 is in his office 270.

Inference of User Status Based on User Role

Figures 3A, 3B:
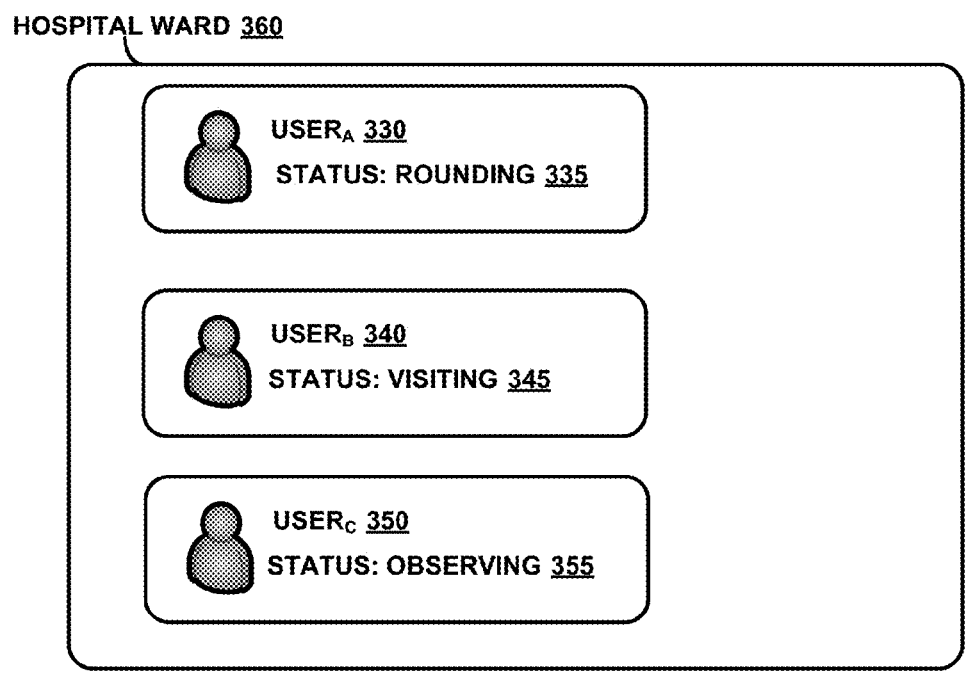
FIG. 3A shows an exemplary user role information maintained by an enterprise wireless network according to embodiments of the present disclosure.
FIG. 3B shows an exemplary scenario in which user presence information is based on role information provided by a WLAN according to embodiments of the present disclosure.

FIG. 3A shows an exemplary user role information maintained by an enterprise wireless network according to embodiments of the present disclosure. Specifically, FIG. 3A includes at least a user field 310 and a role field 320 indicating a user identifier and the user's corresponding role in the organization respectively. For example, $User_A$ 330 may be associated with the role of a physician; $User_B$ 340 may be associated with the role of a guest; $User_C$ 330 may be associated with the role of a staff; etc.

When different users having different roles log on to WLAN at the same location, the presence information for each user may be displayed differently. FIG. 3B shows an exemplary scenario in which user presence information is based on role information provided by a WLAN according to embodiments of the present disclosure. As illustrated in FIG. 3B, three different users, e.g., $User_A$ 330, $User_B$ 340, and $User_C$ 350, are logged on to the UC suite in a hospital ward 360. Based on the role of $User_A$ 330 as a physician, the UC suite may display status "rounding" 335 as $User_A$ 330's status while $User_A$ 330 is located in hospital ward 360. However, based on the role of $User_B$ 340 as a guest, the UC suite may display status "visiting" 345 as $User_B$ 340's status while $User_B$ 340 is located in hospital ward 360. Moreover, based on the role of $User_C$ 350 as a staff, the UC suite may display status "observing" 355 as $User_C$ 350's status while $User_C$ 350 is located in hospital ward 360.

In some embodiments, in a hospital, an important doctor can be easily located at one or more locations at different times of the day by a network infrastructure. Based on the location of the doctor, the network infrastructure can determine the importance of the activity that the doctor currently is involved in. For example, if the doctor's location is found as emergency room, the network infrastructure can assume that the doctor is busy attending some emergency situation. Accordingly, calls to the doctor can be avoided or controlled based on a set of preconfigured policies. Similarly, if the doctor logs on the UC suite from an operation room, the network infrastructure can assume that the doctor is operating in a surgery. Hence, calls to the doctor may be automatically forwarded to voicemail, but the status of the doctor may show that the doctor is available to accept instant messages.

In some embodiments, in a corporate office, if a user is located in an office, the user's status is displayed as "available" by the UC suite. However, if the user is located in a break room, the UC suite can infer that the user is taking a coffee break, and therefore display the user's status as "unavailable."

In some embodiments, if a regular employee is located in a cafeteria, the UC suite can infer that the employee is on lunch break, and therefore display the user's status as "away" or "unavailable." On the other hand, if a chef or a cashier is located in a cafeteria, the UC suite can infer that the user is working, and therefore displaying the user's status as "busy."

In some embodiments, if a telecommuting employee is located in the office, the UC suite may display the employee's status as "onsite." By contrast, if the employee is located at the far away home, or if the network infrastructure detects that the employee is connecting to the corporate network remotely, the UC suite may display the employee's status as "telecommuting" or "work from home."

In some embodiments, the UC suite may determine user status based on colocation of two or more users. For example, if a manager and an employee are located in the same office at the same time, the UC suite may infer that the manager and the employee are in meeting. Therefore, the UC suite can display the status of both the manager and the employee as "busy," even though no meeting or appointment is scheduled on the calendar of either the manager or the employee.

In some embodiments, the UC suite may trigger an update on the status of a user after the user has been detected at a particular location for a predetermined period of time. For example, when a user is moving from one location to another and roaming between multiple APs, the network infrastructure can determine that the user is on the move. Therefore, the network infrastructure can withhold location update to the UC suite. Alternatively, the UC suite can withhold status update for the moving user until the user has been detected at a particular location for longer than a predetermined threshold period of time. Hence, the UC suite will not unnecessarily update the user's status too frequently while the user is moving and the user status cannot be ascertained yet.

In some embodiments, the network infrastructure and/or the UC suite can receive or derive a user's location information from other networks and/or partners, such as, a cellular network. For example, while a user is commuting from home to office, a client application may be running on the user's mobile device. The client application can periodically transmit location information of the user to the network infrastructure. If the user's location information can be obtained, for example, via a cellular network by a Global Positioning System (GPS). The UC suite can infer that the user is traveling towards the office based on the user's recent location information. Therefore, the UC suite may display the user's status as "traveling to office." If the traffic information and/or the user's route information can be obtained, the UC suite may further display an estimated time of arrive as a part of the user's status information.

Figure 4:
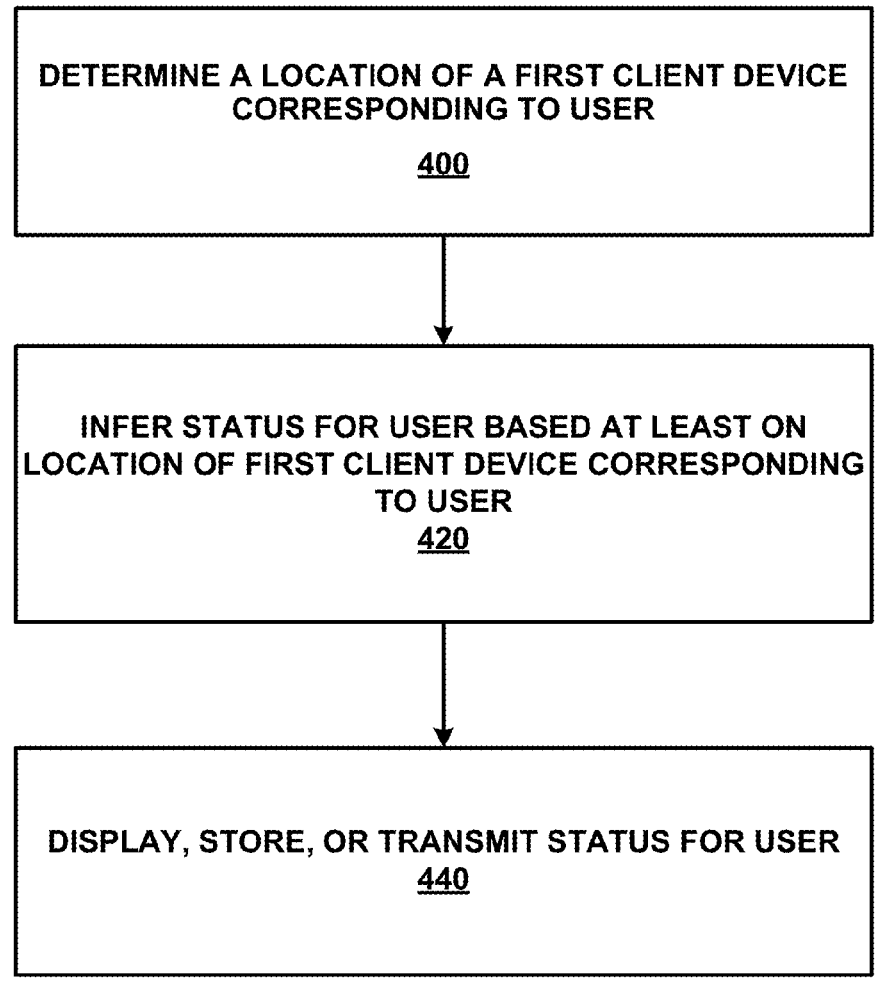
FIG. 4 shows an exemplary process for advertising and profiling user location to UC suite in WLANs according to embodiments of the present disclosure.

Process for Advertising and Profiling User Location to Unified Communication Suite FIG. 4 shows an exemplary process for advertising and profiling user location to UC suite in WLANs according to embodiments of the present disclosure. During operations, a network device determines a location of a client device corresponding to a user (operation 400). Also, the network device infers a status for the user based at least on the location of the client device corresponding to the user (operation 420). Furthermore, the network device can display, store, or transmit the status for the user (operation 440). In some embodiments, the status for the user has not been explicitly indicated by the user.

In some embodiments, the network device can further infer the status of the user is based on a role of the user and/or a profession of the user. In some embodiments, the network device can infer the status of the user further based on an amount of time the client device is detected to be at the location.

In some embodiments, the network device further determines that a second client device, associated with a second user, is at the same location as the first client device. Here, the status inferred for a first user is based on determining that a first client device and the second client device are at the same location.

In some embodiments, the status of the first user is inferred to be busy in response to detecting that the first client device is located in a conference room. In some embodiments, the status of the first user is displayed in an email application and/or chat application.

In some embodiments, the network device can select the first client device, from a set of client devices associated with the first user, for inferring the status of the first user based on usage of the first client device by the first user. For example, if a user is associated with two devices with the first device actively transmitting data on the network and the second device being idle, the network device will select the first device for inferring the status of the first user.

In some embodiments, the network device selects the first client device, from a set of client devices associated with the first user, for inferring the status of the first user based on detecting movement of the first client device. In some embodiments, the network device selects the first client device, from a set of client devices associated with the first user, for inferring the status of the first user based on a time of day when the inferring operation is performed. For example, during work hours, the network device may select to use the first user's corporate device for inferring the status of the first user. By contrast, during non-work hours, the network device may select to use the first user's personal device for inferring the status of the first user.

In some embodiments, the status of the first user is further based on a type of connection between the first client device and a particular network. For example, if a user is connecting via a Virtual Private Network (VPN) connection, the network device may infer the user's status as "working remotely."

Figure 5:
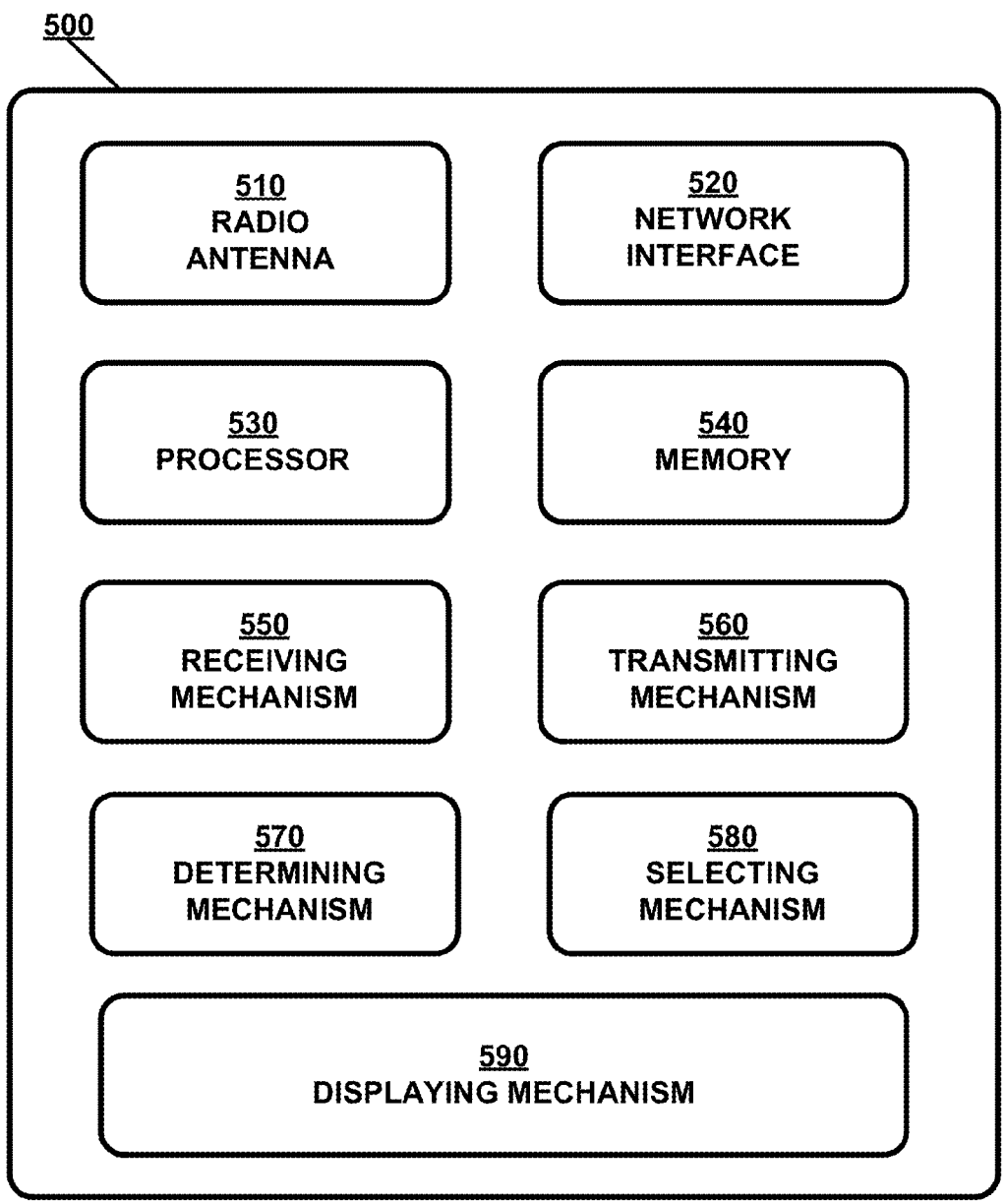
FIG. 5 is a block diagram illustrating an exemplary system for advertising and profiling user location to UC suite in a WLAN according to embodiments of the present disclosure.

System for Advertising and Profiling User Location to Unified Communication Suite FIG. 5 is a block diagram illustrating an exemplary system for advertising and profiling user location to UC suite in a WLAN according to embodiments of the present disclosure. Network device 500 includes at least one or more radio antennas 510 capable of either transmitting or receiving radio signals or both, a network interface 520 capable of communicating to a wired or wireless network, a processor 530 capable of processing computing instructions, and a memory 540 capable of storing instructions and data. Moreover, network device 500 further includes a receiving mechanism 550, a transmitting mechanism 560, a determining mechanism 570, a selecting mechanism 580, and a displaying mechanism 590, all of which are in communication with processor 530 and/or memory 540 in network device 500. Network device 500 may be used as a client system, or a server system, or may serve both as a client and a server in a distributed or a cloud computing environment.

Radio antenna 510 may be any combination of known or conventional electrical components for receipt of signaling, including but not limited to, transistors, capacitors, resistors, multiplexers, wiring, registers, diodes or any other electrical components known or later become known.

Network interface 520 can be any communication interface, which includes but is not limited to, a modem, token ring interface, Ethernet interface, wireless IEEE 802.11 interface, cellular wireless interface, satellite transmission interface, or any other interface for coupling network devices.

Processor 530 can include one or more microprocessors and/or network processors.

Memory 540 can include storage components, such as, Dynamic Random Access Memory (DRAM), Static Random Access Memory (SRAM), etc. In some embodiments, memory 540 stores statuses for users of a WLAN.

Receiving mechanism 550 generally receives one or more network messages via network interface 520 or radio antenna 510 from a wireless client. The received network messages may include, but are not limited to, requests and/or responses, beacon frames, management frames, control path frames, and so on.

Transmitting mechanism 560 generally transmits messages, which include, but are not limited to, requests and/or responses, beacon frames, management frames, control path frames, and so on. In some embodiments, transmitting mechanism 560 transmits a status for a user in the WLAN.

Determining mechanism 570 generally determines a location, a role, and/or a time of the day associated with a user, and infers a status for the user based on such information. Specifically, in some embodiments, determining mechanism 570 determines a location of a first client device corresponding to a first user. Furthermore, based at least on the location of the first client device corresponding to the first user, determining mechanism 570 infers a status for the first user. The status for the first user has not been explicitly indicated by the user. In some embodiments, the status of the first user is inferred to be busy in response to detecting that the first client device is located in a conference room. In some embodiments, the status of the first user is inferred further based on a type of connection between the first client device and a particular network.

In some embodiments, determining mechanism 570 infers the status of the first user further based on a role of the first user and/or a profession of the first user. In some embodiments, determining mechanism 570 infers the status of the first user further based on an amount of time the first client device is detected to be at the location.

In some embodiments, determining mechanism 570 also determines that a second client device, associated with a second user, is at the same location as the first client device. Moreover, the status inferred for the first user is based on determining that the first client device and the second client device are at the same location.

Selecting mechanism 580 generally selects the first client device, from a set of client devices associated with the first user, for inferring the status of the first user based on usage of the first client device by the first user. In some embodiments, selecting mechanism 580 selects the first client device, from a set of client devices associated with the first user, for inferring the status of the first user based on detecting movement of the first client device.

In some embodiments, selecting mechanism 580 selects the first client device, from a set of client devices associated with the first user, for inferring the status of the first user based on a time of day when the inferring operation is performed.

Displaying mechanism 590 generally displays the status for the first user. In some embodiments, the status of the first user is displayed in an email application and/or chat application.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors of a network device, cause the network device to perform multiple operations comprising:
    determining that a first user is logged on a wireless local area network (WLAN) and assigned a first user role during a first time, the first user role corresponding to a first set of network privileges, wherein the first user role is assigned and provided by the WLAN;
    inferring a first status for the first user based at least on the first user role and a first user presence at a particular location for an amount of time during a predetermined period of time of day, wherein the first user presence is based on a first user role information provided by the WLAN;
    displaying the first status for the first user during the first time;
    subsequently assigning a second user role to the first user during a second time, the second user role corresponding to a second set of network privileges, wherein the second user role is assigned and provided by a policy engine in the WLAN, the policy engine configured to collect multiple user attributes for the first user from multiple identity stores and from a third party network to which the first user is subscribed;

determining a first client device corresponding to the first user is located at the particular location during the first time and the second time based at least on the second user role and the first user presence at the particular location for the amount of time during the predetermined period of time of day;

displaying a second status for the first user during the second time;

determining that the first client device is logged on to the WLAN via a virtual private network (VPN) connection for a third time period;

assigning a third user role based on the VPN connection, wherein the third user role corresponds to a third set of network privileges; and displaying a third status for the first user during the third time.

2. The non-transitory computer readable medium of claim 1, wherein the first status for the first user has not been explicitly indicated by the first user.

3. The non-transitory computer readable medium of claim 1, wherein inferring the first status for the first user is further based on an amount of time the first client device is detected to be at the particular location.

4. The non-transitory computer readable medium of claim 1, wherein the operations further comprise: determining that a second client device, associated with a second user, is at a same location as the first client device, wherein the first status inferred for the first user is based on determining that the first client device and the second client device are at the same location.

5. The non-transitory computer readable medium of claim 1, wherein the first status for the first user is displayed in at least one of an email application and a chat application.

6. The non-transitory computer readable medium of claim 1, wherein the first status for the first user is inferred to be busy in response to detecting that the first client device is located in a conference room.

7. The non-transitory computer readable medium of claim 1, wherein the operations further comprise selecting the first client device, from a set of client devices associated with the first user, for inferring the first status for the first user based on usage of the first client device by the first user.

8. The non-transitory computer readable medium of claim 1, wherein the operations further comprise selecting the first client device, from a set of client devices associated with the first user, for inferring the first status for the first user based on detecting movement of the first client device.

9. The non-transitory computer readable medium of claim 1, wherein the operations further comprise selecting the first client device, from a set of client devices associated with the first user, for inferring the first status for the first user based on a time of day when an inferring operation is performed.

10. The non-transitory computer readable medium of claim 1, wherein inferring the first status for the first user is further based on a type of connection between the first client device and the WLAN.

11. A system comprising:
at least one network device comprising a display and a hardware processor; the system being configured to perform operations comprising:
determining that a first user is logged on a wireless local area network (WLAN) and assigned a first user role during a first time, the first user role corresponding to a first set of network privileges, wherein the first user role is assigned and provided by the WLAN;
inferring a first status for the first user based at least on the first user role and a first user presence at a particular location for an amount of time during a predetermined period of time of day, wherein the first user presence is based on a first user role information provided by a policy engine in the WLAN, the policy engine configured to collect multiple user attributes for the first user from multiple identity stores and from a third party network to which the first user is subscribed;
displaying the first status for the first user during the first time;
subsequently assigning a second user role to the first user during a second time, the second user role corresponding to a second set of network privileges, wherein the second user role is assigned and provided by the WLAN;
determining a first client device corresponding to the first user is located at the particular location during the first time and the second time;
based at least on the second user role and the first user presence at the particular location for an amount of time during the predetermined period of time of day;
displaying a second status for the first user during the second time;
determining that the first client device is logged on to the WLAN via a virtual private network (VPN) connection for a third time period;
assigning a third user role based on the VPN connection, wherein the third user role corresponds to a third set of network privileges; and
displaying a third status for the first user during the third time.

12. The system of claim 11, wherein the first status for the first user has not been explicitly indicated by the first user.

13. The system of claim 11, wherein inferring the first status for the first user is further based on an amount of time the first client device is detected to be at the particular location.

14. The system of claim 11, wherein the operations further comprise: determining that a second client device, associated with a second user, is at a same location as the first client device, wherein the first status inferred for the first user is based on determining that the first client device and the second client device are at the same location.

15. The system of claim 11, wherein the first status for the first user is displayed in at least one of an email application and a chat application.

16. The system of claim 11, wherein the first status for the first user is inferred to be busy in response to detecting that the first client device is located in a conference room.

17. The system of claim 11, wherein the operations further comprise selecting the first client device, from a set of client devices associated with the first user, for inferring the first status for the first user based on usage of the first client device by the first user.

18. The system of claim 11, wherein the operations further comprise selecting the first client device, from a set of client devices associated with the first user, for inferring the first status for the first user based on detecting movement of the first client device.

19. The system of claim 11, wherein the operations further comprise selecting the first client device, from a set of client devices associated with the first user, for inferring the first status for the first user based on a time of day when an inferring operation is performed.

20. The system of claim 11, wherein inferring the first status for the first user is further based on a type of connection between the first client device and the WLAN.

* * * * *